(No Model.)
J. A. SHERMAN.
DEVICE FOR TRANSMITTING POWER.
No. 298,317. Patented May 6, 1884.
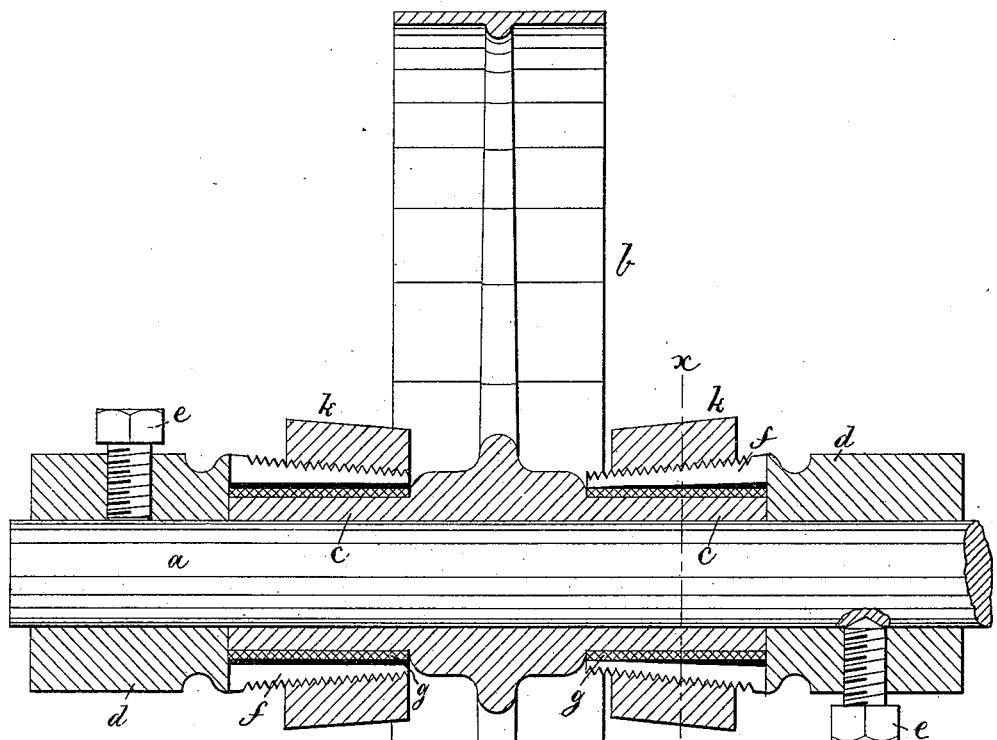
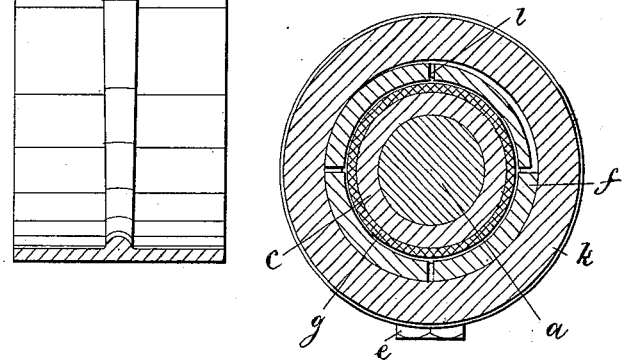
Witnesses.
Henry Marsh,
John F. C. Prenshert
Inventor.
John A. Sherman
by Crosby & Gregory Attys

UNITED STATES PATENT OFFICE.

JOHN A. SHERMAN, OF BOSTON, MASSACHUSETTS, ASSIGNOR OF ONE-HALF TO WILLIAM P. WARD, OF NEW YORK, N. Y.

DEVICE FOR TRANSMITTING POWER.

SPECIFICATION forming part of Letters Patent No. 298,317, dated May 6, 1884.

Application filed November 26, 1883. (No model.)

*To all whom it may concern:*

Be it known that I, JOHN A. SHERMAN, of Boston, county of Suffolk, State of Massachusetts, have invented an Improvement in Devices for Transmitting Power, of which the following description, in connection with the accompanying drawings, is a specification, like letters on the drawings representing like parts.

My invention relates to a device for transmitting power to shafting, and has for its object to permit a regulated amount of force to act upon the said shafting in such a manner that when the resistance produced by the work done or otherwise exceeds a certain amount the machinery will cease to move.

The invention is especially applicable to places where power transmitted by shafting is rented, it preventing a greater amount of power from being used than is contracted for. The invention is shown embodied in a shaft and driving-pulley having a frictional connection therewith, as hereinafter described, by which the shaft and pulley are caused to rotate in unison as long as the force transmitted from one to the other does not exceed the frictional holding-power exerted between them; but when the said transmitted force exceeds the holding-power the driven part will cease to turn, although the driving part continues to rotate, the one part sleeping upon the other.

Figure 1 is a longitudinal section of device for transmitting motion embodying this invention, and Fig. 2 a transverse section thereof on line $x$ $x$.

The device consists of two members, one shown as a shaft, $a$, to which the power may be applied directly and positively from the motor, and from which the power may be transmitted to the other member, (shown in this instance as a pulley, $b$, having a long sleeve-like hub, $c$, fitted to turn loosely upon the shaft $a$, from which the power is to be transmitted.) If desired, however, the pulley $b$ may be actuated directly from the motor and the power transmitted from it to the shaft $a$. The said shaft has fixed upon it clamping devices $d$, (shown as consisting of collars fastened positively upon the shaft by set-screws $e$, and having a tubular portion, $f$, embracing the ends of the hub $c$,) which are provided with bushings or coverings $g$, of a somewhat yielding material, preferably rawhide. The portion $f$ of the clamping devices fits over the said bushing and is split, as best shown at $i$ on Fig. 2, to enable the parts to be contracted and pressed upon the said bushing, the said portion having an external tapering screw-thread, upon which is mounted a co-operating tapering nut, $k$, which, when turned upon the said thread, contracts the portion $f$ of the clamping device, causing it to frictionally hold the hub of the pulley.

By the employment of the yielding sleeve $g$ the frictional holding-power will be almost directly proportional to the pressure of the clamping device, and may be regulated and adjusted to any desired amount, so that when the resistance to the driven member is within a certain definite limit the two members $a$ $b$ will be held together by the friction, and will rotate as a single piece. When, however, the resistance to the driven member is increased, either accidentally by some obstruction to the machinery or by intentionally applying a greater load than the power is intended for, the driven member will be stopped by the said increased resistance, while the driving member actuated by the motor will continue to turn, overcoming the frictional resistance between the two members. By this construction the machinery is protected from breakage by the yielding of the frictional connection between the members of the power-transmitting device, which relieves the mechanism from the momentum and power of the actuating motor; and, furthermore, it is impossible to increase the load or work above the proper limit when a device of this nature is employed and have the machinery continue in operation, performing the excessive work. The sleeve $g$ constitutes a yielding cushion, which will conform to the co-operating surfaces that are frictionally pressed against it, making a substantially uniform pressure on the said surfaces, thus causing the friction to be almost directly proportioned to the pressure, and consequently capable of accurate adjustment, while if the friction were between hard surfaces it would depend upon the accuracy of shape of the said surfaces, since if they departed from the true cylindrical shape the friction would be greater than that due to the direct pressure between the surfaces.

I claim—

1. In a device for transmitting power, the combination, with the member actuated by the motor, of a co-operating member driven thereby, a clamping device, and cushion of yielding material affording a friction-surface for the said clamping device, substantially as described.

2. The combination of the shaft $a$, hub $c$, surrounding the said shaft, and the bushing of yielding material on the said hub, with the clamping device fixed upon the said shaft and engaging the said bushing, the said shaft and hub being intended to be connected one with the actuating motor and the other with the actuated machinery, substantially as and for the purpose described.

3. The shaft $a$ and pulley $b$ thereon, having a hub, $c$, loosely fitted on said shaft, combined with the bushing $g$ and clamping device $d$ $f$ $k$, fixed upon the said shaft and engaging the said bushing, substantially as described.

In testimony whereof I have signed my name to this specification in the presence of two subscribing witnesses.

JOHN A. SHERMAN.

Witnesses:
   Jos. P. LIVERMORE,
   W. H. SIGSTON.